United States Patent [19]

Carrera

[11] Patent Number: 4,747,439
[45] Date of Patent: May 31, 1988

[54] SEAMED TUBULAR TIRES FOR CYCLES

[75] Inventor: Cesare Carrera, Milan, Italy

[73] Assignee: Pneumatici Clement S.p.A., Italy

[21] Appl. No.: 853,611

[22] Filed: Apr. 18, 1986

[30] Foreign Application Priority Data

Apr. 30, 1985 [IT] Italy ................................ 20546 A/85

[51] Int. Cl.⁴ ............................................. B60C 05/08
[52] U.S. Cl. .................................... 152/512; 156/121
[58] Field of Search ............... 152/511, 512, 510, 513, 152/559; 156/121

[56] References Cited

U.S. PATENT DOCUMENTS

| 1,672,858 | 6/1928 | Fisk | 152/512 X |
| 2,550,193 | 4/1951 | Iknayan | 152/511 X |
| 4,274,899 | 6/1981 | Duttlinger | 152/512 X |
| 4,418,736 | 12/1983 | Vandenburgh | 152/512 |
| 4,585,044 | 4/1986 | Carrera et al. | 152/511 X |

FOREIGN PATENT DOCUMENTS

| 54-122507 | 9/1979 | Japan | 152/511 |
| 1471030 | 4/1977 | United Kingdom | 152/510 |

Primary Examiner—Donald E. Czaja
Assistant Examiner—Ramon R. Hoch
Attorney, Agent, or Firm—Stevens, Davis, Miller & Mosher

[57] ABSTRACT

A tubular tire for a bicycle having the carcass seamed on its inner periphery to enclose an inner tube. The seaming is covered by a hand of rubberized fabric that is bonded to and extends around the inner periphery of the tire carcass. The band has two fracture lines so that the band can be torn away to expose the seaming for removal of the inner tube. A non-bonded area on the band permits access to start the tearing.

8 Claims, 2 Drawing Sheets

SEAMED TUBULAR TIRES FOR CYCLES

SUMMARY

The tubular-tires for cycles having the carcass seamed on the inner periphery, presents stitching protected by an outer band which is extended axially from one extremity to the other of the surface which is in contact with the mounting-rim.

The band is jointed by overstitching, and the outer edge of the overstitching is separated from the inner edge along a limited zone, in the proximity of the band-end, by means of an anti-adhesive plate.

The circumferential sides of the said plates, define two predetermined circumferential lines of fracture—that allow for tearing the band along these lines, for in this way baring the stitching and simultaneously safeguarding the band-ends and the corresponding carcass zone.

DESCRIPTION

The present invention concerns tubular-tires for cycles—and in particular those tubular-tires that are seamed.

This type of tire is well-known to everyone by now and for a very long time ago.

It is comprised by a carcass—i.e. by a rubberized fabric-strip, provided with reinforced-cords, which was firstly jointed at its two extremities—to define a cylindrical sleeve; thereafter, the edges of the said sleeve were folded-back (over themselves), axially and radially inwardly, in such a way as to form an annular toroidal body.

Inside this toroidal container, there is housed an inner air-tube which is provided with an inflation-valve—and thereafter, the two sleeve edges are stitched together so as to close the container.

Usually the valve is made to protrude outwards through the stitching.

For reinforcing this jointing-zone of the carcass, the borders of the two edges are usually also turned-up, radically and axially outwardly, for a small length. Moreover, for preventing the stitched-seam from coming into contact with the surface of the mounting-rim, there is disposed a fabric-band over the above-said stitched-seam, which is either glued or vulcanized onto the tube.

When, during use, the tubular-tire is punctured—or rather, when the air-tube is perforated, the band is torn-off the tubular-tire so as to bare the stitched-seam. This latter is cut, in correspondence of the hole in the air-tube (the position of the hold, is previously indicated by means of an absolutely known technique), and for a certain length—that is sufficient for extracting the portion of air-tube to be repaired.

The hole is patched—also in the usual manner, and the air-tube is reinserted into the tubular—tire, after which the borders of the latter are re-stitched again, for completely reclosing the tubular tire.

Finally, also the band is once again glued over the stitched-seam for thus restoring the integrity of the tubular-tire, for further use.

The arduous, if not complex, procedure just described, results nevertheless, as still being worthwhile—if the price of buying a new tubular-tire exceeds the cost for repairing the same. Naturally, it is even more worthwhile if the difference existing between these two expenses is great. This, of course, is also provided that the tire to be repaired, is still in a good enough state for being utilized further.

In the field of tubular tires for cycles, there have recently been put on the market—particularly by the Applicant himself, new and even more specialized products that have brought about a considerable progress in the field, with all the qualitative advantages involved thereby.

The most representative tubular-tire of this sort, is the tubular-tire having a tunnel-shaped cross-section—with a special base-profile and with the joining-corners, between base and flanks, being appropriately reinforced, so much so that—apart from all its other advantages, this tubular-tire also allows for it to be mounted both, on the rims for tubular-tires—of the racing-car type, as well on the rims for bead-tires—that are provided on their edges with check-flanges for the above-said beads.

Undoubtedly, this type of tire does present a high qualitative level and also allows for giving an exceptional performance. However, such tires are more costly than the alternative normal tires and tubular-tires—that are found to be cheaper on the market. So that, what the tire-buyer also expects, is to be able to have his new type of tubular-tires repaired in the above-described traditional way.

On the other hand, in the stitched version of these new tubular tires, the seam-covering band takes an active part and has an important function in the reinforcing structure of the corners, between base and flanks, of the tunnel-shaped cross-section. So much so that tearing-off of the band—and especially if done without any particular care, usually prejudices the behaviour characteristics and usefulness of the repaired tubular-tire, by depriving it, for example, of any possibility that the new tubular-tire has of being mountable alternatively on any whatsoever type of rim.

The Applicant has now discovered that it is quite possible to realize the above-said seam-covering band—in such a way as to allow for reparing the stitched-seam tubular-tire by tearing-off the band—and without damaging, but rather, with also safeguarding the structural characteristics of said tubular-tire—so much so that the aim of this invention is to have a tubular-tire for cycles—provided with a carcass structure comprising a seam-covering band that can be removed several times, without this damaging the structure.

Therefore, the object of the present invention, is a tubular-tire for cycles, that presents along its radially inner development, a base-surface having an axial profile that is adaptable to coupling with the corresponding profile of the mounting-rim profile, and comprising a carcass—formed by at least one rubberized fabric-strip, the ends of said strip being joined to form a ring, with the said strip's edges being jointed together—in the longitudinal direction and in the radially inner position to said strip, the said jointing being realized through the stitching of the two opposite edges, the stitched-seam being covered on its outside with a protective band that is axially extended—at least from one extremity to the other of said base-surface, characterized by the fact that said protective band—is a band that is breakable in a pre-determined way, presenting at least one fracture-line with a circumferential lay-out, with respect to the tubular-tire, disposed axially inside the said supporting-base, in a position that does not coincide with said joint of the carcass edges.

According to some preferred embodiments for the tire of the invention, the said tubular-tire is characterized by the fact that the band presents two fracture-lines, symmetrically disposed with respect to the equatorial plane of the tire, and that the said fracture-lines are practically defined by an incision made on the band, in the proximity of one extremity of said band.

Moreover, a plate made of an unvulcanizable anti-adhesive material, is disposed in the overlapping tract of the band extremities, in the zone concerned of the said incisions. The said plate, presents at least one extremity protruding in the circumferential direction, from the extremity of the said band—or else, as an alternative, it presents at least one extremity protruding axially outwardly with respect to the band, issuing out of one of said incisions.

Preferably, the band extremities are circumferentially jointed by overlapping them, while the band is realized from a rubberized fabric that is reinforced at least with cords disposed longitudinally. Moreover, should the tire present a base-surface countermarked by two lateral portions and a central portion that is clearly distinguished by said lateral portions, the above-said incisions—are then disposed in correspondence of the axially inner extremity of the above-said lateral portions.

In any case, the present invention will be better understood with the aid of the following description and from the attached figures—that are given solely by way of non-limiting example, whereby:

Figure 1:
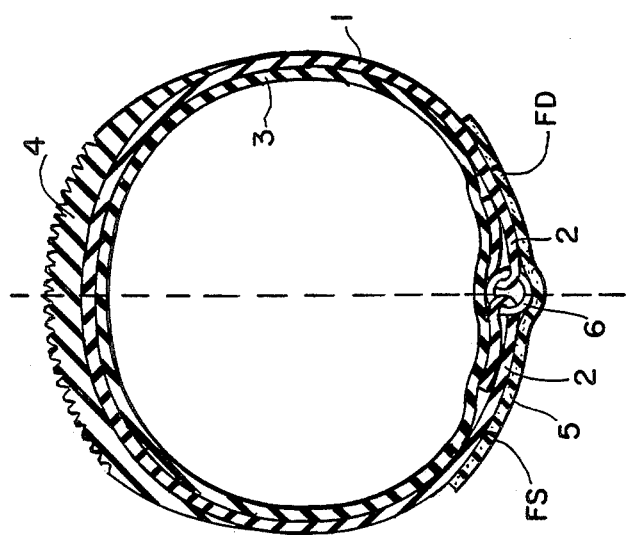
FIG. 1 shows the tubular-tire of the invention, in a usual embodiment.

With reference to FIG. 1, the tubular-tire comprises a carcass with a circular cross-section, comprised by a ply 1—whose edges 2 are folded-back (over themselves) and hence, turned-up axially and radially inwardly, and finally stitched together to form a closed tubular body.

Inside said tubular body, there was connected, prior to the stitching, an air-tube 3—provided with an inflation-valve (not shown).

In the radially outer position, said carcass presents a rubber strip 4 that constitutes the tread-band, which will contact the ground, during tire use.

In the radially inner position, the carcass is provided—on its outer surface, with a band 5 (which is substantially as wide as the surface portion of the tubular-tire), for contacting the surface of the mounting-rim, having the function of favouring the tubular-tire/mounting-rim union, after their gluing, and of protecting the stitching thread 6—precisely from having any direct contact with the surface of said mounting-rim.

Figure 2:
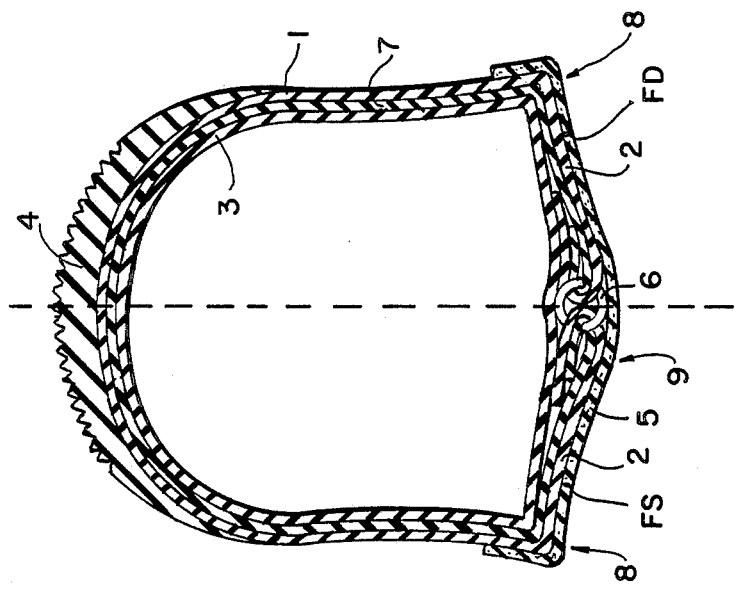
FIG. 2 shows the tubular-tire of the invention—in a particular embodiment with a tunnel-shaped section.

Passing over now to to FIG. 2—the differences from the tubular tire of FIG. 1 are obvious. Apart from the fact of this carcass comprising a second reinforcing ply 7, the cross-section of said tubular-tire is no longer circular—but tunnel-shaped.

In other words, the above-said cross-section presents a base having a special axial profile, comprised substantially by two lateral portions 8, having an axial profile almost parallel to the tire axis, and by a central concave portion 9.

The sidewalls of said tubular-tire (proceeding radially outwardly) are initially rectilineal and successively, by curving axially inwardly—they go inwards, for in this way, defining the characteristic barrel-vault form of the tubular section of the tire.

The union of the sidewalls to the base, is comprised by a rather sharp corner—i.e. having an angle of about 90° or perhaps even of a lesser value.

The seam-covered band 5 extends axially, at least from one corner to the other of the tubular-tire, but, in the preferred version shown, it even turns-up around the above-said corners—by ascending, for a certain distance, the sidewalls of the tubular tire.

Said band constitutes one of the reinforcing elements of the structure of the tubular-tire, at the above-said corners.

Figure 4:
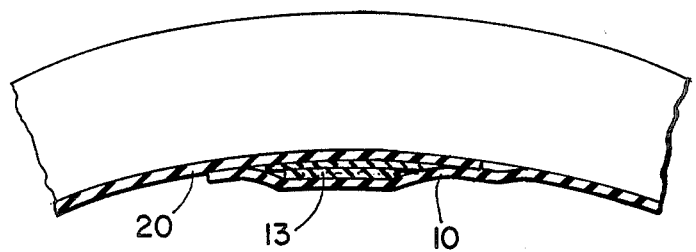
FIGS. 4, 5 and 6 show embodiments of the seam-covering band, according to two diverse alternative solutions.

FIG. 4 illustrates the cross-section of the band, disposed on the tubular-tire, in a view orthogonal to the equatorial plane m-m of the carcass.

Practically speaking, the band presents an overlapping portion which, at the joining point, protects the stitching more efficaciously than could be done by an—also possible, butt-splicing (not shown).

The above-said band is made from a rubberized fabric—either woven or cord, provided with reinforcing textile cords—that are made out of any whatsoever appropriate known material.

The band must be prepared in such a way that said cords (in the cord-fabric) or at least, a group of cords (in the woven-fabric) have a circumferential lay-out with respect to the tire.

The above-said band can be disposed—in a non-vulcanized state, on the raw (unvulcanized) carcass—and in this case, it is welded to the same—through a successive vulcanizing process, or else, it can be glued to the carcass even in the phase successive to that of vulcanizing—in particular when the band, or the carcass—or both these elements, are already in a partially-vulcanized state—prior to their being reciprocally assembled.

In said case, the gluing can be strengthened by using appropriate adhesives.

From said figures—and particularly from FIG. 2, what is immediately apparent is the serious damaging effects done to the carcass's structural resistance—in particular, in the delicate lateral zones, by the said tearing-off, of the band from the surface of the carcass, in the vulcanized tire, during tire use.

According to the invention, the band is hence, provided with at least one pre-determined zone of fracture, in correspondence of a circumferential line—not coinciding with the joining-line of the carcass-edges—i.e. in alignment with the stitching.

For preference, the pre-determined fracture-lines are two in number and are disposed symmetrically with respect to the equatorial plane of the tire in an axially inner position respecting the base-width of the tubular-tire and—in the case of the tubular-tire having a tunnel-shaped cross-section, they run along the line of demarcation, between the flat-zone and concave-zone of the base-profile, as deferentiated by the more or less sharp change in the curve of the above-said profile.

In FIGS. 1 and 2, these fracture-lines are defined by the points FS and FD.

Figure 3:
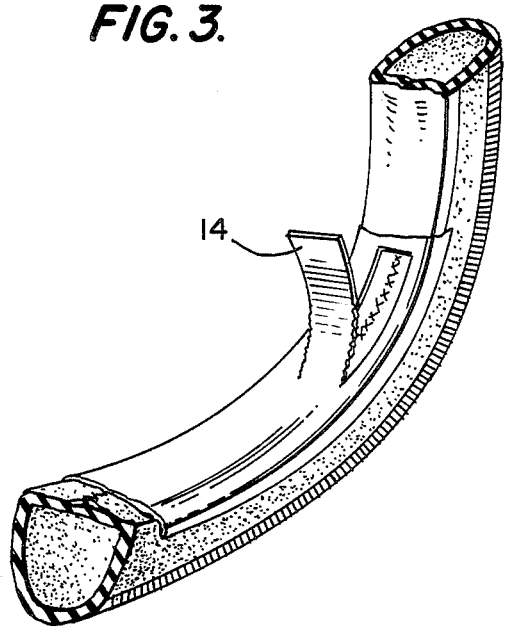
FIG. 3 shows the tubular-tire of the invention, when the seam-covering band is being torn-off—during the repairing phase.

FIG. 3 shows, in a clear manner, the just described characteristic.

Said pre-determined zones of fracture, are formed through inserting into the overlapping zone—between the two extremities of the band, or—as an alternative, even between the band and the carcass, a plate made of a non-vulcanizable material which is incapable of achieving any adhesion with the surrounding rubberized fabric—for, in this way creating a zone, in the total width of the band, that is axially narrower and in coincidence with which, the outer band does not adhere to the underlying fabrics. In the plastic materials' field, the question just arises of selecting a suitable material from which to make the plate. For example, the Applicant finds it opportune to use a polyester—that is commercially known as Mylar (Registered Trademark).

Figure 5:
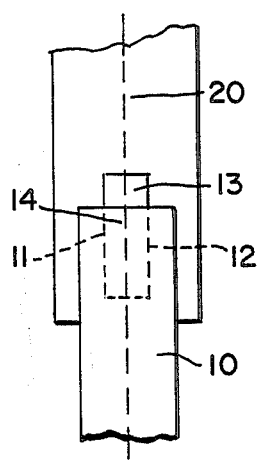

FIG. 5 shows a first embodiment, for solving the problem.

Figure 6:
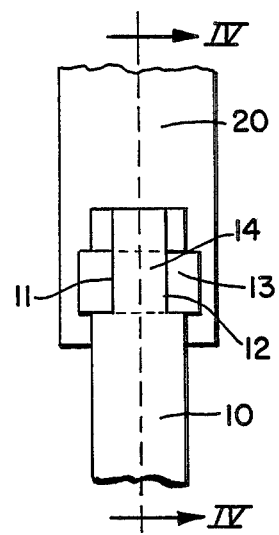

In this figure—as in FIG. 6, the two overlapped extremities of the band 5—are planned so that the edge that lies in the innermost position, is wider than the overlapping edge.

This artifice—which does not exist an actual embodiment, has the sole purpose of facilitating the comprehension of the text and of the drawings.

According to the solution shown in FIG. 5, between the outer edge 10 (of band 5) and the inner edge 20, there is inserted a plate 13—made of the above-said anti-adhesive material; with said plate being narrower than the width of said edge 10. In particular, the plate has the same axial width as the portion comprised between the pair of points FS and FD (see FIGS. 1 and 2) with a length of a few centimeters—and preferably, it is disposed in such a way as to protrude circumferentially, from the extremity of the outer edge.

It is very clear that, during the vulcanization of the tire, it will be made quite impossible for said outer edge to adhere to the surrounding rubberized fabrics, along the area protected by plate 13—so much so that the sides of said plate determine the above-mentioned pre-determined fracture-lines on the outer edge.

As an alternative, according to the solution that is shown in FIG. 6, the anti-adhesive plate 13 is now, no longer oriented longitudinally—but transversally with respect to the tire, and it is made to pass through two, previously made incisions 11 and 12, still on the outer edge of the band—in such a way as to protrude axially from at least one of these incisions, but preferably from both (just as is shown in the figure).

The width of the plate 13—must be less than the length of the outer edge against which it rests, in such a way as to allow for the said edge to adhere to the underlying fabric—at both sides of the plate, the effect of which will still be of impeding any gluing taking place, between the outer edge and the underlying fabric, in correspondence of the area protected by the plate.

The two incisions 11 and 12, can be extended from the border of the edge 10—up to the furthest circumferential border of plate 13 (as indicated in FIG. 6), but they could even be just restricted to the tract in correspondence of said plate. Obviously, in this latter case, the operation of inserting the plate into the two above-said incisions, will be more arduous.

The behaviour of this band will now appear easier to understand, with also making particular reference to FIG. 3.

Hence, once the need to proceed with repairing the air-tube (inserted into the tubular-tire) is verified—firstly, and if the tire is made according to the version of FIG. 6, a transversal cut is made—from the part nearest to the edge-extremity, that joins the two longitudinal incisions 11 and 12. Whereas, if the tire is made according to the version of FIG. 5, two incisions (11 and 12) are made in correspondence of the sides of the plate 13.

Resulting from the presence of the anti-adhesive plate—that can now be removed, there is created a band-tang 14—delimited by the indicated cuts, that is not attached to the carcass.

This tang is now taken hold of, and the tearing off—of the band, is carried-out.

As a result of these two longitudinal incisions 11 and 12—which have originated the pre-determined fracture-line, the band is detached from the tubular-tire, with its continuing to break along the above-said circumferential lines—for thus making bare the stitched-seam, but without, in the least way, damaging either the lateral portions or, with them, the corresponding carcass zone—in particular, the zones of corners, on the tubular-tire that has a tunnel-shaped cross-section.

Once the air-tube has been repaired and the tubular tire re-stitched, the band is glued back into place—to be detached once again, should any successive further need arise for repairing the air-tube.

The fact of the band being originally vulcanized—together with the carcass, does not consititute any obstacle as regards its being torn-off—along, in particular, the predetermined fracture-lines. This is because the adhesion—between elastomeric material and cords (in particular those cords used for stitching the edges of the tubular-tires), has a lesser adhesive force as compared to that existing between elastomeric materials—nor does it have such a value as to impede the detaching of the band from the above-said cords.

The advantages of the invention are many and also quite evident by now.

In the first place, the band is assembled onto the carcass in a single operation, and the centering of the band—with respect to the equatorial plane of the tire, is quite easily assured.

In fact, it is clear that an alternative solution can be thought of—consisting of disposing, on the inner periphery of the tubular-tire, three distinct adjoining bands—one in a central position, protecting the stitching, and the other two in lateral positions for reinforcing the corners and the lateral portions of the tubular-tire surface—intended for coming into contact with the rim—in such a way as to isolate, right from the start, the band that is destined to be torn-off the tubular-tire, should the need arise. Nevertheless, all the other technical and economical disadvantages to be had with a similar solution, are also evident.

With the band according to the invention instead, it is made possible to realize the tubular-tire with the same care and precision—as used for tires which are not intended for being opened-up (the repairing takes place through using special sealing-substances that are injected from the outside into the air-tube) and hence, there is guaranteed for the same, the maximum qualitative level for the finished product.

Moreover, with the need being verified for opening-up the tubular-tire, the band (of the invention) having its pre-determined breaking zone, allows for carrying out all the operations of: the unstitching, repairing and re-stitching of the tubular-tire—without interfering with the more important zones of the tire structure, which fact is essential for having good tire behaviour during use—and hence, the qualitative level of the tire performance and the service life-time of the tire, are not compromised.

To end with, although the present description has been given solely by way of non-limiting example, what is also comprised within the ambit of the present patent are also all those modifications and alternative variations even if not expressly described, that are easily available to the one skilled in the art.

What is claimed is:

1. A tubular tire for a bicycle having a radial inner periphery with a profile adapted to fit a corresponding profile of a wheel rim comprising
    a carcass formed of at least one rubberized fabric strip; said rubberized fabric strip having two opposite lateral edges joined together to form a torodial body with seaming means securing said edges of the strip together around the inner periphery of said toroidal body;
    an inner tube enclosed within said toroidal body;
    a rubberized fabric band having an axial width sufficient to cover at least the width of the radial inner surface of said toroidal body with said inner surface facing the wheel rim and said band being bonded to said toroidal body with said band extending around the entire inner periphery of said toroidal body so as to cover the means securing the strip together;
    the pair of longitudinal ends of said band being circumferentially joined to each other by means of overlapping said ends;
    at least two circumferentially extending fracture lines on said band, said fracture lines being positioned axially so as to be spaced from said means securing the strip together;
    a non-bonded zone disposed along the axial width of the radial inner-most of the overlapping pair of ends of the band on said band so as to permit access to the band to tear it off the toroidal body along said fracture lines.

2. The tubular tire of claim 1 in which the two fracture lines are symmetrically disposed with respect to the equatorial plane of the tire.

3. The tubular tire claim 2 in which the fracture lines are formed by incisions in said band and extending parallel to the edge of the band.

4. The tubular tire of claim 1 in which said non-bonded zone is formed by a plate of non-vulcanizable non-adhesive material located between said band and said toroidal body and between said fracture lines.

5. The tubular tire of claim 4 in which said plate has at least one extremity protruding in the circumferential direction from said band.

6. The tubular tire of claim 4 in which said plate has at least one extremity protuding axially outwardly with respect to the band, said extremity protuding from one of said fracture lines.

7. The tubular tire of claim 1 in which said band is reinforced by at least longitudinal disposed cords.

8. The tubular tire of claim 1 having a tunnel shaped cross sectional profile with a base surface presenting two lateral substantially flat portions and a central substantially concave portion, the fracture lines being disposed along the axial inner extremities of said lateral portions.

* * * * *